Oct. 16, 1928.
D. J. CONANT
1,687,658
SLEEVED PUMP MOTOR
Filed Aug. 7, 1926
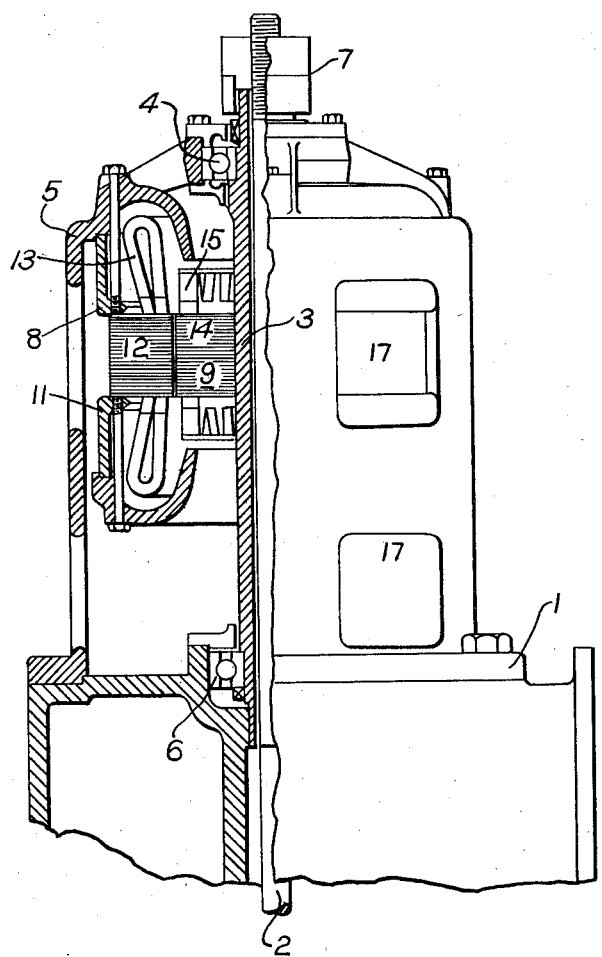
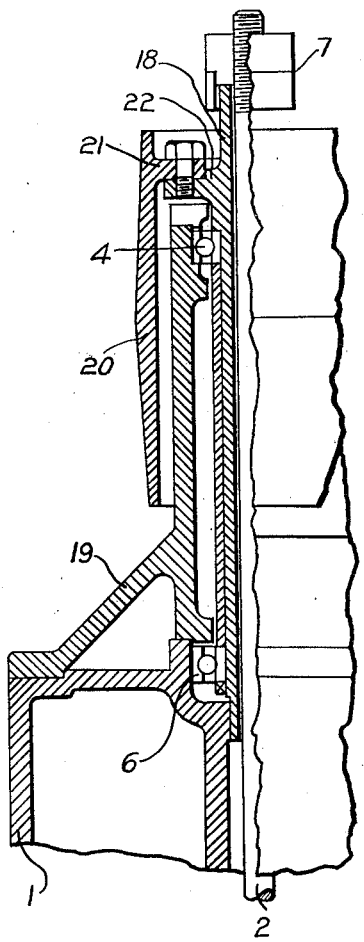
WITNESSES:
*A. J. Schiefelbein*
*O. B. Buchanan*
INVENTOR
*David J. Conant*
BY
*Chesley G. Carr*
ATTORNEY Patented Oct. 16, 1928.

1,687,658

UNITED STATES PATENT OFFICE.

DAVID J. CONANT, OF PITTSBURGH, PENNSYLVANIA, ASSIGNOR TO WESTINGHOUSE ELECTRIC & MANUFACTURING COMPANY, A CORPORATION OF PENNSYLVANIA.

SLEEVED PUMP MOTOR.

Application filed August 7, 1926. Serial No. 127,723.

My invention relates to the construction and mounting of electric motors for use as means for operating pumps to withdraw liquid from wells.

The principal object of my invention is to provide a standard mounting and auxiliary parts for the mounting of stator and rotor units of the same diameter but of different lengths.

Heretofore, electric motors have been applied to well-pumping service in many different designs and arrangements. However, there has always been a difficulty resulting from the impossibility of predicting the depths to which the liquid would fall in any given well, and, hence, the size of motor necessary to pump the liquid from the well.

It is obviously undesirable, as regards first cost, efficiency of operation, and power factor, where induction motors are used, to furnish an equipment with a motor which is considerably larger than the expected requirements of any particular installation.

In the past, when the liquid level in a well dropped so low as to require a motor of larger horsepower, it has been necessary to substitute a motor which stood higher from the pump base, and this has necessitated the removal of the pump shaft which extends into the well and the substitution of a longer shaft.

It is the object of my invention to overcome the difficulties just mentioned, in a practical device utilizing standard parts.

My invention will best be understood by reference to the accompanying drawing, wherein Fig. 1 is an elevational view, partly in section, showing the application of my motor mounting to a pump assembly, and Fig. 2 is a fragmentary sectional view showing a standard belt drive which is substituted for the motor of Fig. 1

In Fig. 1, my invention is shown applied to a pump base 1 of which only the top portion is shown. The pump base is of a standard design, such as is furnished by manufacturers of pumping machinery for application to the tops of wells, and it need not be further described in the present application.

A pump shaft 2 extends into the well and projects outwardly above the pump base.

According to my invention I utilize a pump shaft 2 that extends above the pump base a substantially uniform distance which is so shown as to be sufficient to accommodate electric motors of the largest sizes which it is customary to supply for wells of the type in question.

Loosely surrounding the pump shaft 2 is a sleeve 3 which, according to my invention, is also of a standard height and is supported, at its upper end, by a combined radial and thrust bearing 4 which carries the entire weight of the moving parts and is supported by an outside frame 5, likewise of standard height, which rests upon the pump base. Preferably, also, the lower end of the sleeve is guided in a radial bearing 6 in the top of the pump base, although some manufacturers prefer to make the last-mentioned bearing a thrust bearing also.

A coupling 7 is provided at the tops of the pump shaft 2 and the sleeve 3 for transmitting driving torque from the sleeve to the pump shaft.

An electric motor is provided, comprising a stator member 8 and a rotor member 9, the stator member comprising a frame 11 carrying a core member which includes a laminated structure 12 and stator windings 13. The rotor member 9 comprises magnetizable laminations 14 and secondary windings 15 and is rigidly mounted on the sleeve 3. The rotor member is thus supported by the sleeve. The stator member is supported, in proper relation to the rotor member, by the outer supporting frame 5.

It will be observed that the outer supporting frame 5, the sleeve 3 and the part of the pump shaft 2 which extends above the pump base 1, are all of a standard height which is sufficient to accommodate motors of different sizes. Thus, a somewhat larger motor may be utilized, than that illustrated in Fig. 1.

Suitable ventilating openings 17 are provided in the supporting frame, as will be understood.

Occasionally it is necessary or desirable to drive a pump by means of a belted drive and it has been customary for pump manufacturers to supply belt-driven heads for their pumps. It has been necessary, however, to furnish a large variety of sizes and styles of belt drives in order to render the mechanism interchangeable between a direct-connected motor and a belt-driven pump.

According to my invention, since there is only one size and style of motor mounting, there is only one size and style of belt-drive mounting necessary for adapting the pumping equipment to the belt drive. Accordingly, I have shown, in Fig. 2, a convertible pulley assembly utilizing the same pump base 1, pump shaft 2 and lower bearing 6 as in the motor-driven mechanism of Fig. 1. A sleeve 18 is provided, which is also of the same length as the sleeve 3 in Fig. 1, and the same coupling device 7 is utilized at the tops of the sleeve and the shaft. The upper bearing 4, supporting the sleeve, is carried by a housing 19 which seats on the pump base 1 in place of the outer frame member 5 of Fig. 1. Preferably, the housing 19 extends up inside the pulley 20, which is supported by a web or spider 21 near its top and a co-operating web or spider 22 extending from the sleeve 18.

While I have described a preferred embodiment of my invention in detail, it will be obvious that many changes and modifications may be adopted without departing from the essential features of the invention. I desire, therefore, that the appended claims shall be accorded the broadest interpretation consistent with their language and the prior art.

I claim as my invention:

1. In a hydraulic pumping mechanism, the combination with a pump base at the top of a well, of a vertical pump shaft extending a substantially standard distance above the pump base, a sleeve of standard length surrounding the upper portion of said pump shaft, a driving connection between the upper ends of said shaft and said sleeve, a radial and thrust bearing for the upper portion of said sleeve, supporting means for supporting said bearing at a standard distance above said pump base, said supporting means and pump base constituting a stationary member, and an electric motor comprising a stator core and a rotor core supported by said stationary member and said sleeve, respectively, said supporting means, said sleeve and said pump shaft being each of a standard height sufficient to accommodate any one of a series of motors of different ratings.

2. In a hydraulic pumping mechanism, the combination with a pump base at the top of a well, of a vetrical pump shaft extending a substantially standard distance above the pump base, a sleeve of standard length surrounding the upper portion of said pump shaft, a driving connection between the upper ends of said shaft and said sleeve, a radial and thrust bearing for the upper portion of said sleeve, supporting means for supporting said bearing at a standard distance above said pump base, said supporting means and pump base constituting a stationary member, a radial bearing carried by said stationary member for guiding the lower end of said sleeve, and an electric motor comprising a stator core and a rotor core supported by said stationary member and said sleeve, respectively, said supporting means, said sleeve and said pump shaft being each of a standard height sufficient to accommodate any one of a series of motors of different ratings.

3. In a hydraulic pumping mechanism, the combination with a pump base at the top of a well, of a vertical pump shaft extending a substantially standard distance above the pump base, an outer frame member of standard height mounted on said pump base, a bearing mounted at the top of said frame member, a sleeve of standard length mounted in said bearing, a bearing for said sleeve in said pump base, driving means for connecting the pump shaft and sleeve, and an electric motor comprising a stator core and a rotor core supported by said outer frame member and said sleeve, respectively, said outer frame member, said sleeve and said pump shaft being each of standard height sufficient to accommodate any one of a series of motors of different ratings.

4. In a hydraulic pumping mechanism, the combination with a pump base at the top of a well, of a vertical pump shaft extending a substantially standard distance above the pump base, an outer frame member of standard height mounted on said pump base, a radial and thrust bearing mounted at the top of said frame member, a sleeve of standard length suspended from said radial and thrust bearing, a radial bearing guiding said sleeve in said pump base, driving means for connecting the pump shaft and sleeve, and an electric motor comprising a stator member and a rotor member supported by said outer frame member and said sleeve, respectively, said outer frame member, said sleeve and said pump shaft being each of standard height sufficient to accommodate any one of a series of motors of different ratings.

5. The combination of a pump shaft of standard length, a sleeve surrounding said shaft, bearings for said sleeve, driving means connecting the pump shaft and sleeve, and means for driving the sleeve, comprising any one of a plurality of interchangeable motors of different sizes and ratings, the positions of said bearings being the same regardless of the size of the motor.

6. The method of manipulating a well-pumping apparatus including a pump-base at the top of a well, a vertical pump shaft extending above the pump-base, a sleeve surrounding the projecting upper portion of the pump shaft, a driving connection between the upper end of the shaft and the sleeve, a radial and thrust bearing for the upper portion of the sleeve, a driving means associated with said sleeve, and a separate supporting means for supporting said bearing in spaced position above said pump-base, the spacing being more than ample for the driving means originally utilized when the liquid-level is high in the well, said method consisting in the steps of operating the apparatus with said original driving means while said liquid-level remains high, and in substituting a different driving means adapted for higher energy-output, without altering the height of said bearing, when said liquid-level has fallen to a considerably lower level.

7. A well-pumping apparatus including a pump-base at the top of a well, a vertical pump shaft extending above the pump-base, a sleeve surrounding the projecting upper portion of the pump shaft, a driving connection between the upper end of the shaft and the sleeve, a radial and thrust bearing for the upper portion of the sleeve, and a driving means associated with said sleeve and removable from said pumping apparatus, said pumping apparatus being characterized by having a separate supporting means for supporting said bearing in spaced position above said pump-base, the spacing being more than ample for the driving means originally utilized when the liquid-level is high in the well.

In testimony whereof, I have hereunto subscribed my name this 5th day of August, 1926.

DAVID J. CONANT.